United States Patent

Bartels et al.

[11] Patent Number: 6,110,365
[45] Date of Patent: Aug. 29, 2000

[54] FLUID FILTER, MORE PARTICULARLY SPIN-ON TYPE FLUID FILTER

[75] Inventors: Antonius Josephus Bartels; Geurt Jan Hendrik Vleemingh, both of Arnhem, Netherlands

[73] Assignee: Fairey Arlon, B.V., Netherlands

[21] Appl. No.: 09/217,698

[22] Filed: Dec. 21, 1998

Related U.S. Application Data

[63] Continuation of application No. PCT/NL97/00355, Jun. 25, 1997.

[30] Foreign Application Priority Data

Jun. 25, 1996 [NL] Netherlands ............................ 1003417

[51] Int. Cl.⁷ ............................ B01D 35/30; B01D 35/31
[52] U.S. Cl. ......................... 210/232; 210/440; 210/444; 210/450; 210/DIG. 17
[58] Field of Search ................................... 210/232, 440, 210/450, 453, 443, 444, DIG. 17

[56] References Cited

U.S. PATENT DOCUMENTS

| | | |
|---|---|---|
| 3,067,880 | 12/1962 | Bowers et al. . |
| 3,411,632 | 11/1968 | Offer et al. . |
| 3,616,933 | 11/1971 | Baldwin . |
| 4,738,776 | 4/1988 | Brown . |
| 5,066,391 | 11/1991 | Faria . |
| 5,118,417 | 6/1992 | Diebel . |
| 5,342,519 | 8/1994 | Friedmann et al. . |
| 5,584,987 | 12/1996 | Mules . |

FOREIGN PATENT DOCUMENTS

| | | |
|---|---|---|
| 0 616 825 A1 | 9/1994 | European Pat. Off. . |
| 34 29 634 A1 | 2/1986 | Germany . |

*Primary Examiner*—Thomas M. Lithgow
*Attorney, Agent, or Firm*—Todd Deveau; Troutman Sanders, LLP

[57] ABSTRACT

A filter, in particular, a fluid filter of the "spin-on" type, comprising a head with an inlet space and an outlet space and with a coaxially extending connecting spigot, a housing with one open end, said housing containing an annular-cylindrical filter element and having a terminal edge that confines said open end and sealingly engages a groove provided in the body of said head and positioned coaxially around said connecting spigot, as well as an annular disc-shaped intermediate piece screwed onto said connecting spigot and supporting said filter element. An edge portion of said intermediate piece extending beyond said filter element is screwed into said housing and is provided with passage openings. Head, intermediate piece and filter housing are sealingly assembled with one single ring.

9 Claims, 2 Drawing Sheets

FLUID FILTER, MORE PARTICULARLY SPIN-ON TYPE FLUID FILTER

This application is a continuation of and claims priority to International Application No. PCT/NL97/00355 filed Jun. 25, 1997.

FIELD OF THE INVENTION

The invention relates to a filter, in particular, a fluid filter.

BACKGROUND OF THE INVENTION

Such a filter, which in professional circles is called "spin-on filter", is disclosed in EP-A-0 616 825 (see the embodiment according to FIGS. 3 and 5).

With this well-known filter the cup-shaped filter housing is externally threaded and screwed into a correspondingly internally threaded skirt portion of the intermediate piece, the terminal edge of the housing bearing against a sealing ring provided in a groove in the intermediate piece. The intermediate piece has a second sealing ring on the side turned towards the head, which sealingly engages a lower annular surface of the head.

SUMMARY OF THE INVENTION

The filter according to the present invention distinguishes from this well-known filter in that the filter includes a housing that is inwardly threaded and screwed on the corresponding threaded outer circumferential wall of an intermediate piece screwed on to a connecting spigot with the terminal edge of the filter housing bearing against a sealing ring. The sealing ring is received in a groove in an annular face of the head that surrounds the connecting spigot.

The filter according to the invention has the advantage, that the head, the intermediate piece and the filter housing can be sealingly assembled by means of one single sealing ring. Moreover the intermediate piece may be kept substantially lighter.

It is to be remarked, that U.S. Pat. No. 5,342,519 discloses a filter of the "spin-on" type, with which the housing is also internally threaded and screwed onto a correspondingly externally threaded circumferential portion of an intermediate piece. In this case, however, like the filter according to EP-A-0 616 825, two separate sealing rings are required for assembling the filter, the intermediate piece and a head (not shown in U.S. Pat. No. 5,342,519).

A preferred embodiment of the filter according to the invention is characterized in that the intermediate piece has a circumferential edge portion which is enlarged towards the head, and passage openings which are formed as circumferential recesses of the intermediate piece.

By forming the passage openings as circumferential recesses the annular face of the intermediate piece supporting the filter element is correspondingly increased, which makes the filter suitable for higher pressures.

The filter according to the invention is particularly suitable for use with a filter element of the type disclosed in NL-A-1001867.

Correspondingly a practical embodiment of the filter according to the invention is characterized in that the filter includes an annular cylindrical filter element that is directly and sealingly bearing with its upper edge, formed by an annular disc of a flexible type of rubber or similar elastomeric material, against the substantially flat lower face of the intermediate piece and that the intermediate piece of the filter is provided at its inner circumference with a downwardly extending collar which projects into the upper end of a perforated tube that supports a filter element formed of pleated filtering cloth.

The invention will be hereinafter further explained by way of example with reference to the drawing.

DETAILED DESCRIPTION OF THE INVENTION

Figure 1:
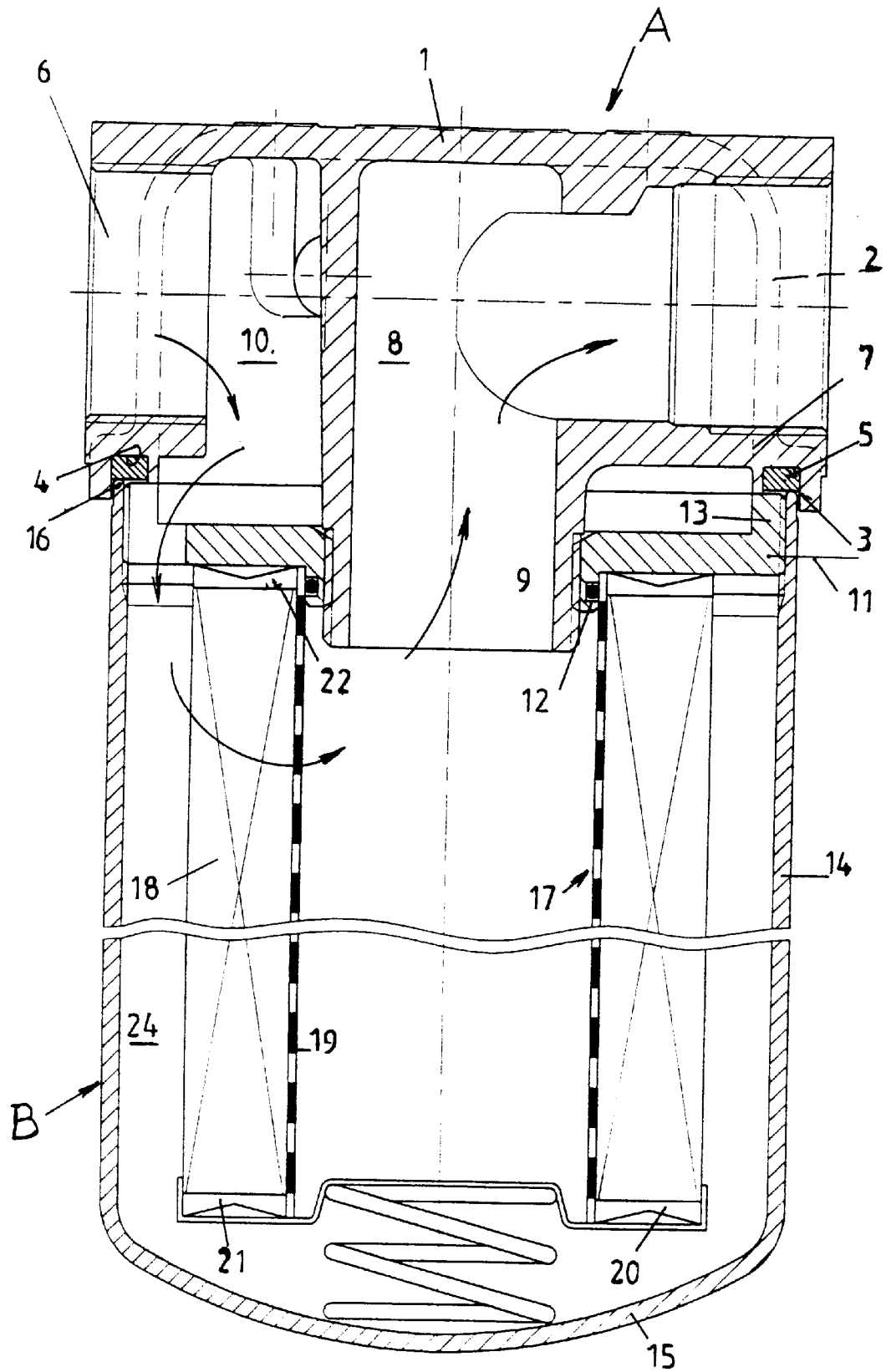
FIG. 1 is a vertical cross-sectional view of the filter according to the invention and FIG. 2 is a plan view of a support plate with which the circumferential recesses are, as distinguished from what is shown in FIG. 1, positioned pairwise diametrically opposite to one another.

The liquid filter shown in the drawing, which is more particularly adapted as an oil filter, comprises a head A and a housing B. The head A mainly consists of a cap-shaped body with an upper wall 1 and a circumferential wall 2, the enlarged lower edge 3 of which has an annular groove 4 for receiving sealing material 5. At two diametrically opposite locations the circumferential wall 2 is provided with an inlet connection 6 and an outlet connection 7 respectively. The outlet connection 7 is connected to an outlet space 8, which is confined by a connecting spigot 9, that extends from the upper wall 1 downwardly. The inlet connection 6 is connected to the remainder of the cap space, which constitutes the inlet space 10.

An annular disc-shaped support plate 11 is screwed on the externally threaded lower end of the connecting spigot 9. This support plate has a central, downwardly extending collar 12 and is correspondingly internally threaded. The support plate 11 has an enlarged circumferential edge 13, which is externally threaded. For the rest the support plate 11 is completely flat.

The housing B is a metallic housing 14, which is closed at one end by a convex end wall 15 and has its open upper end screwed on the enlarged circumferential edge 13 of the support plate 11. The housing may be manufactured in a well-known manner, e.g. by cold extrusion.

In operational condition the housing 14 screwed onto the support disc 11 extends with its upper terminal edge 16 beyond the enlarged circumferential edge 13 of the support disc into the groove 4 of the head and thereby in sealing contact with the sealing material 5.

Within the housing 14 there is an annular cylindrical filter element 17. This filter element comprises in a well-known manner an annular cylindrical filter body 18 formed of pleated filtering cloth and provided on the inner side with a metallic, perforated tube 19. The filter body bears with its lower annular end wall on a metallic bottom plate 20 which in turn is resiliently supported by the convex end wall 15.

The filter element 17 is preferably formed in the manner disclosed in NL-A-1001867, i.e. with the terminal ends of the cylindrical filter body (formed of pleated filtering cloth) embedded in sealing rings 21 and 22 respectively of a flexible type of rubber or similar elastomeric material. This enables the annular cylindrical filter body to bear with the upper sealing ring 22 directly against the flat lower face of the support plate 11.

The internal metallic support tube 19 may be fastened to the bottom plate 20 and is centered at its upper end by the collar 12 of the support plate 11.

Figure 2:
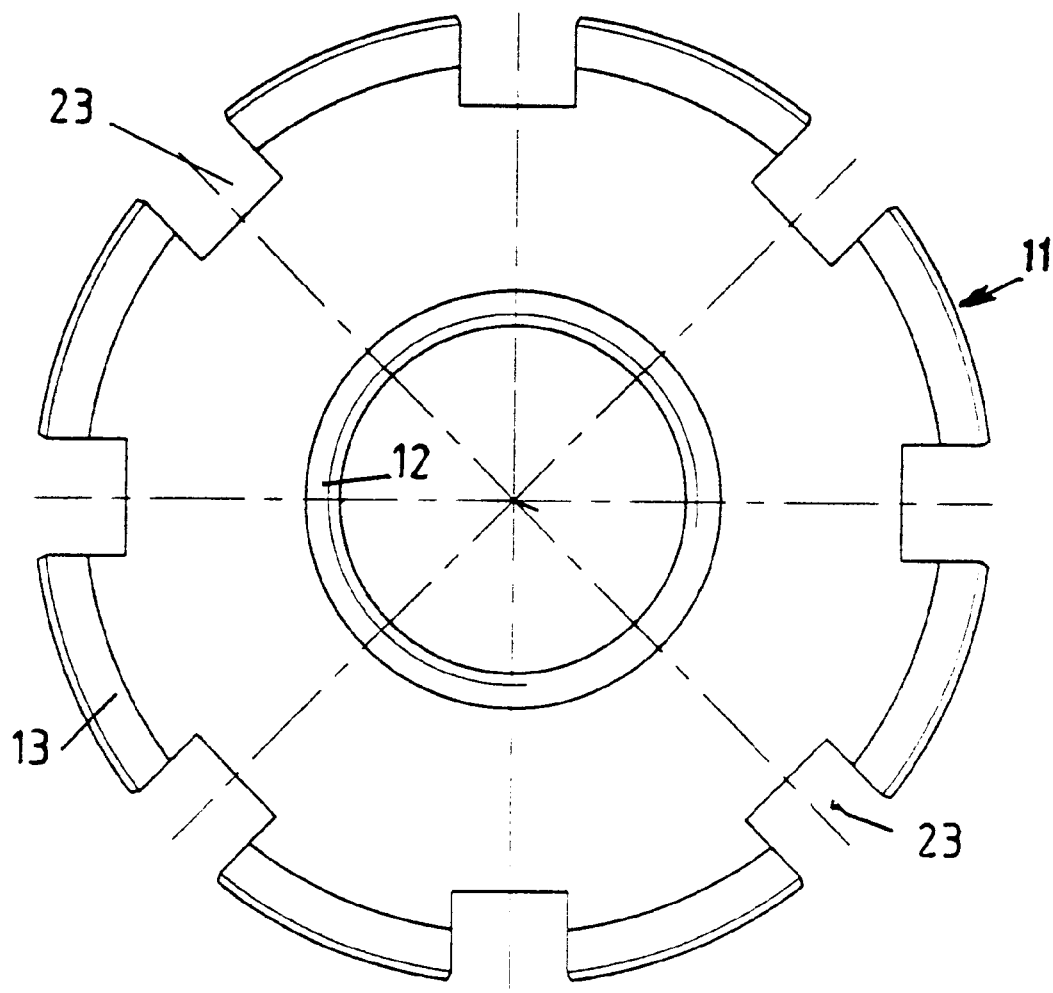

As is particularly shown in FIG. 2, the support plate is provided with circumferential recesses 23 at circumferentially spaced locations, which recesses constitute connecting or passage openings between the inlet space 10 and the space 24 around the filter element 17. The flow path of the liquid to be filtered and of the filtered liquid is indicated by arrows.

When the filter has become filthy the filter housing 14 is simply unscrewed, while the support plate 11 is left in place. This releases the filter element 17 from the support plate 11 so that the part 18 of it may be simply replaced by a fresh one, after which the assembly may be put back into the operational condition by re-fastening (screwing) the filter housing.

What is claimed is:

1. A filter, in particular a fluid filter, comprising:
    a head with an inlet space, an outlet space and a coaxially extending connecting spigot;
    an annular disc-shaped intermediate piece screwed onto said connecting spigot and sealed to prevent leakage toward the outside of said filter; and
    a cup-shaped filter housing, containing an annular-cylindrical filter element and having its terminal edge sealingly screwed onto a circumferential portion of said annular disc-shaped intermediate piece, said filter element having its annular end face turned away from the closed filter housing end bearing against said intermediate piece, said circumferential portion of said intermediate piece being provided with passage openings, which connect the space between said filter element and said filter housing to one of the group selected from the group consisting of the inlet space in the head and the outlet space in the head,
    wherein said filter housing is inwardly threaded and screwed on the corresponding threaded outer circumferential wall of said intermediate piece, and wherein said terminal edge of said filter housing bears against a sealing ring, which is received in a groove in an annular face of said head that surrounds said connecting spigot.

2. A filter according to claim 1, wherein said intermediate piece has a circumferential edge portion which is enlarged towards said head.

3. A filter according to claim 1, wherein said passage openings are formed as circumferential recesses of said intermediate piece.

4. A filter according to claim 2, wherein said intermediate piece with its enlarged circumferential edge bears against an inner circumferential wall portion confining said groove for said sealing ring inwardly.

5. A filter according to claim 1, wherein said annular cylindrical filter element is directly and sealingly bearing with its upper edge, formed by an annular disc of a flexible type of rubber or elastomeric material, against the substantially flat lower face of said intermediate piece.

6. A filter according to claim 1, wherein said intermediate piece is provided at its inner circumference with a downwardly extending collar, which projects into the upper end of a perforated tube that supports the proper filter element formed of pleated filtering cloth.

7. A filter according to claim 2, wherein said passage openings are formed as circumferential recesses of said intermediate piece.

8. A filter according to claim 3, wherein said intermediate piece is bearing against an inner circumferential wall portion confining said groove for said sealing ring inwardly.

9. A filter according to claim 7, wherein said intermediate piece is bearing against an inner circumferential wall portion confining said groove for said sealing ring inwardly.

* * * * *